(12) United States Patent
Michalakis et al.

(10) Patent No.: US 10,759,444 B2
(45) Date of Patent: Sep. 1, 2020

(54) RESOURCE OPTIMIZATION IN VEHICLES

(71) Applicant: Toyota Research Institute, Inc., Los Altos, CA (US)

(72) Inventors: Nikolaos Michalakis, Saratoga, CA (US); Julian M. Mason, Redwood City, CA (US); James J. Kuffner, Jr., Sunnyvale, CA (US); James M. Adler, Redwood City, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 268 days.

(21) Appl. No.: 15/644,283

(22) Filed: Jul. 7, 2017

(65) Prior Publication Data

US 2019/0009790 A1 Jan. 10, 2019

(51) Int. Cl.

| | | |
|---|---|---|
| *B60R 22/00* | (2006.01) | |
| *E05F 15/00* | (2015.01) | |
| *G05D 1/00* | (2006.01) | |
| *G05D 3/00* | (2006.01) | |
| *G06F 7/00* | (2006.01) | |
| *G06F 17/00* | (2019.01) | |
| *B60W 50/06* | (2006.01) | |

(Continued)

(52) U.S. Cl.
CPC ............ *B60W 50/06* (2013.01); *G06F 9/505* (2013.01); *G06F 9/5044* (2013.01); *G06F 11/3013* (2013.01); *G06F 11/3051* (2013.01); *G06F 11/3433* (2013.01); *H04L 67/12* (2013.01); *B60W 2050/0013* (2013.01); *B60W 2050/0077* (2013.01); *G06F 2209/509* (2013.01)

(58) Field of Classification Search
CPC ......... B60W 50/06; B60W 2050/0013; B60W 2050/0077; G06F 9/5044; G06F 11/3013; G06F 11/3051; G07C 5/008; G07C 5/0841; G07C 5/085; G01N 99/005
USPC .......................................................... 701/48
See application file for complete search history.

(56) References Cited

U.S. PATENT DOCUMENTS

| | | | |
|---|---|---|---|
| 2016/0150040 A1* | 5/2016 | Fan .................... | H04L 67/28 709/217 |
| 2018/0261020 A1* | 9/2018 | Petousis ............... | G07C 5/008 |
| 2018/0322413 A1* | 11/2018 | Yocam .................. | G07C 5/085 |

OTHER PUBLICATIONS

Shahzad, K., "Cloud Robotics and Autonomous Vehicles", Chapter 1 from Autonomous Vehicle, Publisher: InTech, ISBN 978-953-51-2585-3, Sep. 7, 2016 in 20 pages.

(Continued)

*Primary Examiner* — Mahmoud S Ismail
(74) *Attorney, Agent, or Firm* — Christopher G. Darrow; Darrow Mustafa PC (57) ABSTRACT

This disclosure describes various embodiments for resource optimization in a vehicle. In an embodiment, a system for resource optimization in a vehicle is described. The system may comprise a memory; a processor coupled to the memory; and a resource optimization module. The resource optimization module may be configured to: monitor usage of local computing resources of the vehicle, the local computing resources comprising the processor and available bandwidth of a transmission medium; determine an availability of the local computing resources; evaluate data captured by one or more sensors of the vehicle; and determine whether to process the data locally or remotely based, at least in part, on the availability of the local computing resources and the data captured by the one or more sensors.

21 Claims, 5 Drawing Sheets

(51) Int. Cl.
  *G06F 9/50* (2006.01)
  *G06F 11/30* (2006.01)
  *H04L 29/08* (2006.01)
  *G06F 11/34* (2006.01)
  *B60W 50/00* (2006.01)

(56) References Cited

OTHER PUBLICATIONS

Whaiduzzaman et al., "A Survey on Vehicular Cloud Computing", Journal of Network and Computer Applications (2013) pp. 1-29.
Arif, S. et al., "Datacenter at the Airport: Reasoning about Time-Dependent Parking Lot Occupancy", IEEE Transactions on Parallel and Distributed Systems, vol. 23, No. 11, pp. 2067-2080, Nov. 2012.
Aminizadeh, L. et al., "Cost Minimization Scheduling for Deadline Constrained Applications on Vehicular Cloud Infrastructure," 2014 4th Internatoinal Conference on Computer and Knowledge Engineering (ICCKE), pp. 358-363.
Armbust, M., et al., "A View of Cloud Computing," Communications of the ACM, Apr. 2010 printed from http://cacm.acm.org/magazines/2010/4/81493-a-view-of-cloud-computing/fulltext on Dec. 15, 2016 in 12 pages.
Kumar, S., et al., "A Cloud-Assisted Design for Autonomous Driving," Proceedings of the First Edition of the MCC Workshop on Mobile Cloud Computing—MCC '12, Aug. 17, 2012.
Bradley, J., et al., "Optimization and Control of Cyber-Physical Vehicle Systems," Sensors, 15, 23020-23049 (2015).

\* cited by examiner

RESOURCE OPTIMIZATION IN VEHICLES

TECHNICAL FIELD

The subject matter described herein relates in general to computing resources in vehicles, and more particularly, to resource optimization in vehicles.

BACKGROUND

Automobiles have on-board computers for processing data and controlling the vehicle. Automobiles also have means for communicating with other vehicles and remote computers. The on-board computers process data received from sensors in the vehicle. The sensors collect data about the vehicle and about the environment around the vehicle. The on-board computer controls various vehicle systems based, at least in part, on the data gathered by the sensors.

SUMMARY

This disclosure describes various embodiments for resource optimization in a vehicle. In an embodiment, a system for resource optimization in a vehicle is described. The system may comprise a memory; a processor coupled to the memory; and a resource optimization module. The resource optimization module may be configured to: monitor usage of local computing resources of the vehicle, the local computing resources comprising the processor and available bandwidth of a transmission medium; determine an availability of the local computing resources; evaluate data captured by one or more sensors of the vehicle; and determine whether to process the data locally or remotely based, at least in part, on the availability of the local computing resources and the data captured by the one or more sensors.

In another embodiment, a method for resource optimization in a vehicle is described. The method may comprise monitoring usage of local computing resources of the vehicle, the local computing resources comprising a processor and available bandwidth of a transmission medium, determining an availability of the local computing resources; evaluating data captured by one or more sensors of the vehicle; and determining whether to process the data locally or remotely based, at least in part, on the availability of the local computing resources and the data captured by the one or more sensors.

In another embodiment, a vehicle is described. The vehicle may comprise one or more sensors; a memory; a processor coupled to the memory; and a resource optimization module. The resource optimization module may be configured to: monitor usage of local computing resources of the vehicle, the local computing resources comprising the processor and available bandwidth of a transmission medium; determine an availability of the local computing resources; evaluate data captured by the one or more sensors; and determine whether to process the data locally or remotely based, at least in part, on the availability of the local computing resources and the data captured by the one or more sensors.

DETAILED DESCRIPTION

Described herein are various embodiments of systems and methods for resource optimization in a vehicle. A resource optimization module in a vehicle may be configured to evaluate data gathered by various sensors in the vehicle. The data gathered by the vehicle may include outward sensor data or inward sensor data. Outward sensor data may include data about the environment around the outside of the vehicle, e.g., road conditions, traffic control devices, etc. Inward sensor data may include data about the vehicle, e.g. speed, wheel orientation, throttle position, etc. The resource optimization module may determine which data should be processed locally in the vehicle and which data should be processed remotely. In some cases, data may be processed both locally and remotely. The resource optimization module may prioritize processing of data based upon the importance of the data, e.g., processing data related to road construction or an accident may take priority of processing data related to fuel efficiency. In addition to considering the importance of data, the resource optimization module may also consider the availability of computational resources, e.g., memory, processors, transmission bandwidth, etc.

The resource optimization module may determine to process data in one of three ways: 1) streaming computation in the vehicle; 2) streaming computation remotely; and 3) batch computation remotely. Streaming computation may happen in near real-time as the data is collected. Batch computation may happen after data is collected and stored, e.g., stored data is uploaded after the vehicle is parked. The resource optimization module may move the processing on or off vehicle based upon whether or not the vehicle is busy processing other data.

The resource optimization module may evaluate various constraints when determining whether to offload data processing. The following constraints are meant to be examples and not an exhaustive list. A first constraint may be available bandwidth for data transmission. The bandwidth may include any transmission medium used to move data within the vehicle and/or to remote storage/processing. A second constraint may include computing power of the vehicle and/or remote computing power. Computing power may include available memory, software, processing power, etc. When evaluating computing power, the resource optimization module may consider strength of determination, e.g., the complexity of an algorithm for processing data; and portability, e.g., can the calculation be completed while the vehicle is in motion. A third constraint may include data privacy. Certain data may contain personally identifiable information or some other data that is sensitive. In this case, the data may be processed locally in order to prevent transmission of personally identifiable information or other sensitive data to a remote location. A fourth constraint may include storage space on the vehicle. If adequate storage space is available in the vehicle, the resource optimization module may determine to store the data locally for batch processing later.

As data is created or processed by the vehicle, data provenance information, e.g., when and how data was created, captured, and/or processed, may be associated with the data. Provenance information may be used to form assessments about data quality, reliability, and/or trustworthiness. The provenance information may include data about how much processing has been done on the data in the vehicle and/or remotely. Provenance information may be included in metadata associated with the data. The metadata may be stored in a metadata field associated with the data. The metadata may include data tags. The following are examples of data tags and are not meant to be an exhaustive list. A tag may be used to identify that the data includes personally identifiable information, e.g., images of faces, license plates, etc. Another tag may be used to identify whether the data has been processed and how much the data has been processed, e.g., facial blurring, object recognition, etc. A tag may be used to identify what software was used to process the data, e.g., type and version. The resource optimization module may use metadata as a filter for handling data. For example, data associated with metadata including a personally identifiable information tag may not be transmitted off the vehicle.

In an embodiment, the resource optimization module may be configured for error detection and correction. The resource optimization module may determine data should be processed locally in real-time. Later, the vehicle may park and the resource optimization module may determine to batch process the previously processed data. The batch processing may occur locally in the vehicle or remotely, e.g. a cloud based processor. The results of the batch processing may be compared to the results of the data processed in real-time. The vehicle may adjust sensors and detection algorithms as necessary based upon the comparison of the two sets of results.

In an embodiment, the resource optimization module may be configured for software debugging. The resource optimization module may determine to process data locally in real-time. Later, the vehicle may park and the resource optimization module may determine to batch process the previously processed data using a different version of the software. The results of the batch processing using a different version of software may be compared to the results of the data that was processed in real-time. Differences in the results produced by the different versions of software may be used to target and repair bugs in the software.

In an embodiment, the resource optimization module may be configured to corroborate estimated real-time processing results. The corroboration may be accomplished using cloud based data and processing. The vehicle may detect an object and estimate what the detected object is. Based upon algorithms and sensor data the vehicle may estimate with a degree of certainty what the object is in real-time. By retrieving cloud based data, the resource optimization module may increase the degree of certainty of what an object is. Data provenance may be used to ensure the freshness and reliability of the retrieved cloud based data. Previously processed data associated with data being processed in real-time by the vehicle may have been processed using a more robust piece of software and stored in the cloud. The vehicle may retrieve the results of the processing from the more robust software and correlate them to the results using local software in the vehicle. A weighting algorithm may be used to weight the higher quality data retrieved from the cloud and the fresher data collected by the vehicle. In some embodiments, the vehicle may trust the real-time data more than data retrieved from the cloud due to the freshness of the real-time data. For example, a first vehicle may drive along a roadway. The first vehicle may detect a stop sign on the right side of the road with 90% certainty. The first vehicle may upload the data related to the stop sign to the cloud. The data may comprise the determination and related metadata, e.g., time stamp, confidence level, etc. The raw captured data may also be uploaded for additional processing. A second vehicle may approach the area where the stop sign was detected and retrieve the data uploaded by the first vehicle. The second vehicle may examine the area where the stop sign was detected and also detect the stop sign. The confidence level of the stop sign detection by the second vehicle may be increased based upon the retrieved data from the cloud. In some embodiments, the vehicle may trust data retrieved from the cloud more than the real-time data due to the robustness of processing available in the cloud. For example, mapping data received from several different vehicles and stitched together using the more robust cloud processors may be more trust worthy than mapping data captured in real-time at the vehicle.

Figure 1:
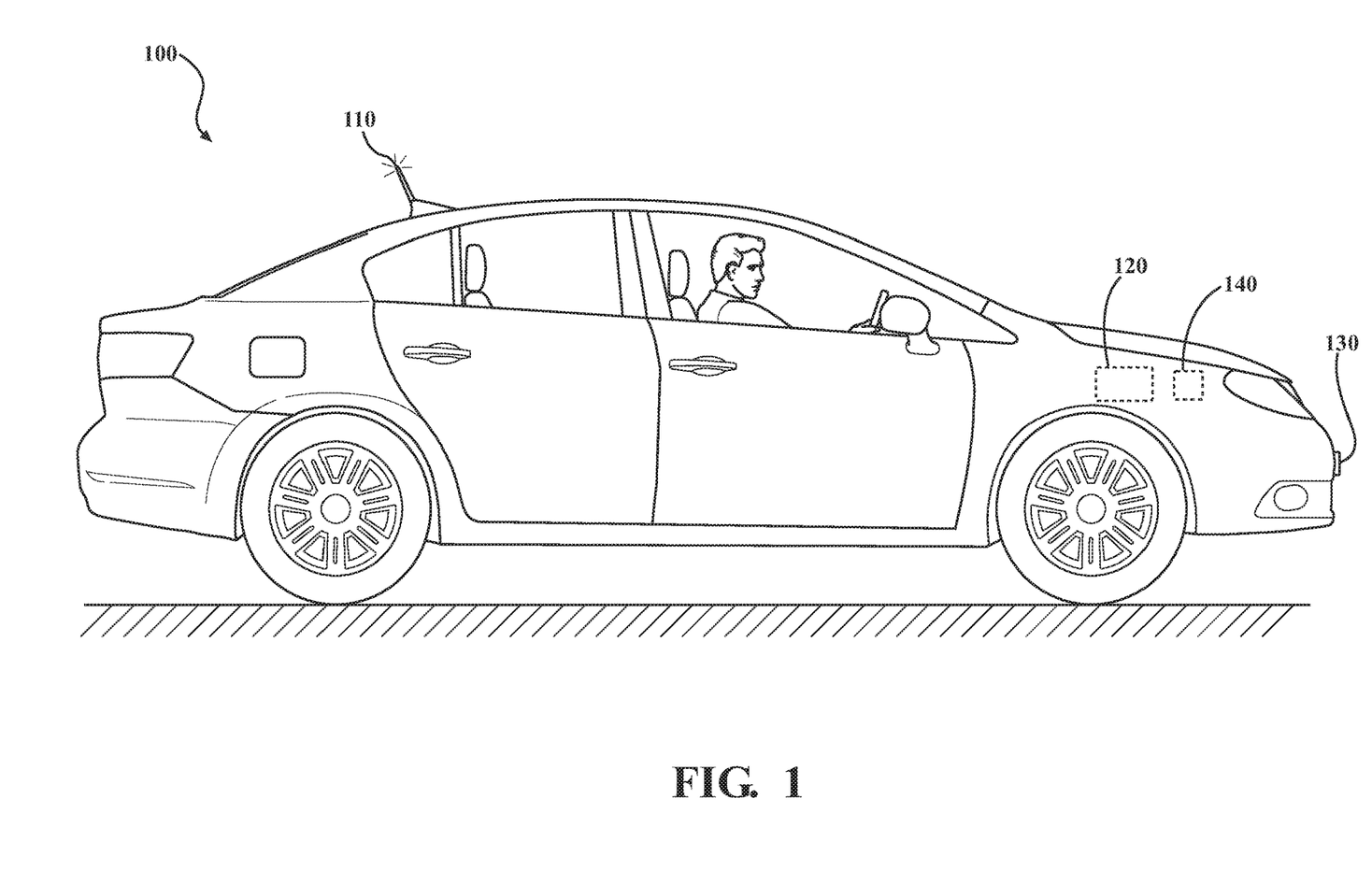
FIG. 1 is a diagram of an embodiment of a vehicle with a resource optimization module.

FIG. 1 is a diagram of an embodiment of a vehicle 100 with a resource optimization module 120. Vehicle 100 may be an automobile or some other wheeled vehicle. Vehicle 100 may be an autonomous vehicle. Vehicle 100 may comprise an antenna 110 for communicating wirelessly. Wireless communication may occur by any wireless communication protocol using antenna 110. Antenna 110 may be positioned in other locations on vehicle 100 and additional antennas may be used as necessary. Vehicle 100 may also comprise a resource optimization module 120. The resource optimization module 120 may be a standalone component within vehicle 100 and/or may be a part of some other system within vehicle 100. The resource optimization module 120 is discussed in greater detail with relation to FIG. 2.

The vehicle 100 may also contain one or more sensors 130. While only one sensor is depicted, other embodiments may use more than one sensor. Sensor 130 may be a camera, RADAR, LiDAR, or other type of sensor or combination of sensors for monitoring the surroundings of the vehicle 100. Sensor 130 may be configured to gather outward data about the surroundings of the vehicle 100. Sensor 130 may be configured to gather inward data about the vehicle 100. Sensor 130 may provide data it gathers to an electronic control unit (ECU) 140. ECU 140 may process all, some, or none of the data gathered by sensor 130. The ECU may decide which data to process based upon control information received from the resource optimization module 120. Some or all of the data may be stored locally on the vehicle, uploaded to a remote data storage, or deleted. Data storage decisions may be controlled by resource optimization module 120.

Figure 2:
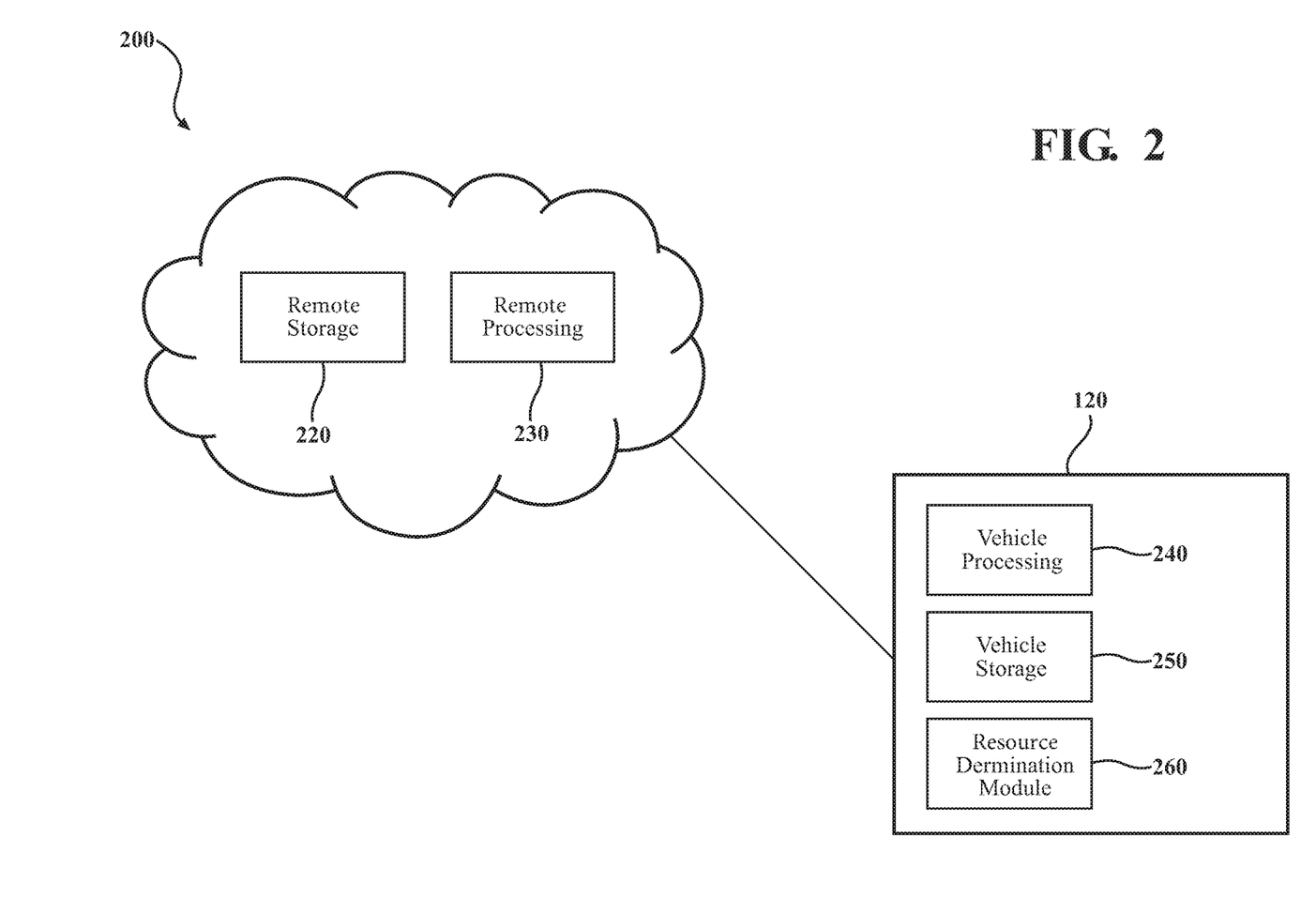
FIG. 2 is a diagram of an embodiment of a system for resource optimization in a vehicle.

FIG. 2 is a diagram of an embodiment of a system 200 for resource optimization in a vehicle. The system 200 may comprise a resource optimization module 120, remote storage 220, and remote processing 230. Remote storage 220 may be any kind of data storage remotely located from a vehicle, e.g., vehicle 100. Remote processing 230 may be any kind of data processing capability remotely located from the vehicle. Remote processing 230 may include distributed processing or cloud based processing. Remote storage 220 may include cloud based storage or a network-attached-storage (NAS) system at a home of the vehicle.

The resource optimization module 120 may comprise a vehicle processing monitor 240, vehicle storage monitor 250, and a resource determination module 260. Vehicle processing monitor 240 may be configured to monitor the data processing capabilities of the vehicle. For example, the vehicle may comprise one or more processors for processing data. The data may include but is not limited to data about the surroundings of the vehicle, e.g., outward data; and data about vehicle performance and other data captured by subsystems of the vehicle, e.g., inward data. Vehicle processing monitor 240 may monitor the processor load of the various processors in the vehicle. Vehicle processing monitor 240 may also monitor data transmission rates via wireless communication, e.g., antenna 110, from the vehicle. Vehicle processing monitor 240 may monitor bandwidth usage and availability for communication systems of the vehicle. Vehicle storage monitor 250 may monitor the data storage capabilities of the vehicle. The vehicle may have one or more data storage capabilities including but not limited to volatile memory and non-volatile memory. Vehicle storage monitor 250 may monitor the capacities and/or data throughput of data storage devices in the vehicle.

Resource determination module 260 may be configured to receive some or all of the resource data gathered by vehicle processing monitor 240, vehicle storage monitor 250, and/or other subsystems of the vehicle. Based, at least in part, upon the resource data, the resource determination module 260 may determine which resources should be used for processing and/or storage of data gathered by vehicle sensors. The resources for processing and/or storage may be local on the vehicle and/or remotely located. For example, the resource determination module 260 may determine to offload processing tasks when the onboard vehicle processors are tasked above a certain percentage. In another example, the resource determination module 260 may determine to store data for later processing. The resource determination module may determine to store data remotely or locally based, at least in part, on available local storage and/or bandwidth availability for transmission to remote storage/processing. In an embodiment, the functionality of the vehicle processing monitor 240, vehicle storage monitor 250 and resource determination module 260 may be combined into one or more modules or distributed among additional modules.

Figure 3:
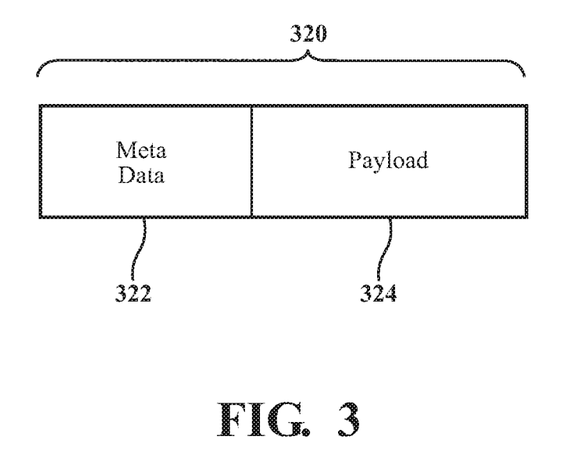
FIG. 3 is a diagram of an embodiment of a data storage unit.

FIG. 3 is a diagram of an embodiment of a data storage unit 320. ECU 140 may receive data from various sensors, e.g., sensor 130, in vehicle 100. ECU 140 may also determine metadata related to the data received from the sensors. The metadata may be included as part of data storage unit 320 in metadata field 322. The metadata may include information about the data in payload 324. The metadata may include one or more tags indicating characteristics of payload 324. The metadata may include a tag for identifying whether the associated payload includes personally identifiable information (PII). The metadata may include a tag for identifying whether the associated payload has been processed or evaluated and/or whether any additional processing or evaluation may be needed. If the payload 324 has been previously processed and/or evaluated, the metadata may include information about how the payload was processed/evaluated, e.g., the software used for processing. ECU 140 and resource optimization module 120 may evaluate metadata field 322 in determining how to process/evaluate payload 324. For example, if a tag in the metadata 322 indicates the payload 324 contains PII, the resource optimization module may determine to not transmit that payload 324 off the vehicle. The metadata may also include information regarding provenance of the associated payload. Provenance may indicate information about sensors and/or other devices involved in creating or capturing data. Provenance information may be used to form assessments about data quality, reliability, and/or trustworthiness. Provenance may be tracked using provenance protocols, e.g., the PROV data model for provenance.

Figure 4:
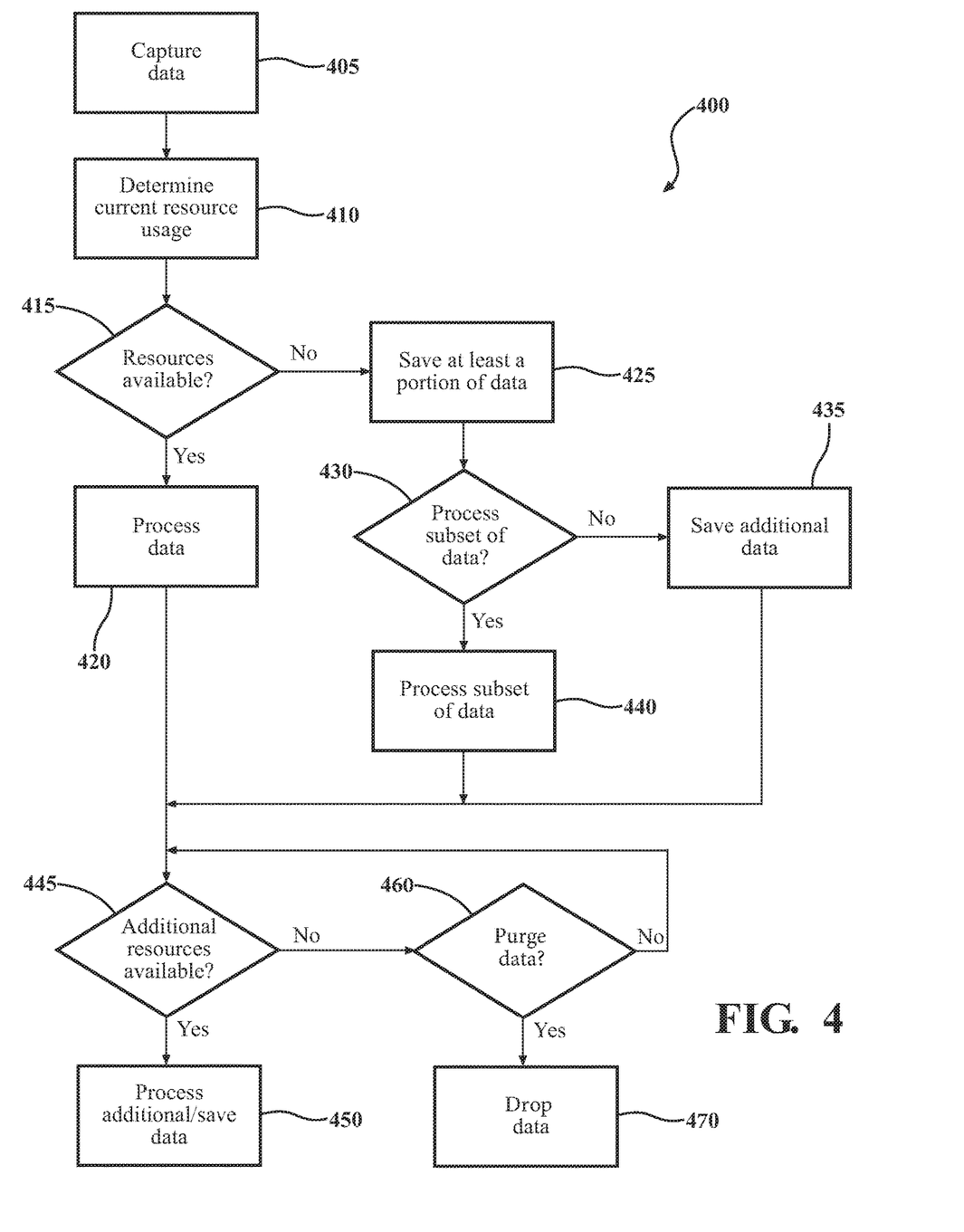
FIG. 4 is a flow diagram of an embodiment of a method for resource optimization in a vehicle.

FIG. 4 is a flow diagram of an embodiment of a method 400 for resource optimization in a vehicle. The method 400 begins at block 405 when data may be collected by sensors, e.g., sensor 130, in a vehicle. The sensors may collect either in-board or off-board data. Off-bard data may include, but is not limited to, outward facing sensors collecting data regarding the environment surrounding the vehicle. In-board data may include, but is not limited to, inward facing sensors that may collect data related to speed, wheel orientation, throttle position, etc.

At block 410, a resource optimization module, e.g., resource optimization module 120, may determine the current resource usage in the vehicle. The resource optimization module may comprise one or more resource monitors, for example, vehicle processing monitor 240 and vehicle storage monitor 250. The resource monitors may monitor: available transmission bandwidth from the vehicle to remote storage/processing resources; computing power, e.g., memory and processor availability; and/or available local data storage space. The resource monitors may monitor other resources as necessary.

At block 415, the resource optimization module may determine whether adequate resources are available to process the data captured at block 405. The resource optimization module may compare the amount of data awaiting processing to the currently available resources and/or resources that may become available. The resource optimization module may determine what type of resources are required to process the data and compare the determination to the available resources. If the resource optimization module determines that resources are available, the data may be processed by the vehicle at block 420. If resources are not available, at least a portion of the data may be saved by the vehicle at block 425. The resource optimization module may evaluate the data and determine whether or not to save all, some, or none of the data. This determination may be based at least in part on the available local storage in the vehicle and/or available bandwidth for transmitting data from the vehicle. Other factors may be considered when determining whether or not to save the data.

At block 430, the resource optimization module may determine whether to process a subset of the data. The resource optimization module may determine if resources are available to process a smaller portion of the data. For example, only a portion of a captured image may be processed, or a lower resolution version of the image may be processed. If the resources are not available to process a subset of the data, the subset of data or some other data, e.g., information about what has or has not been processed, may be stored by the vehicle at block 435. If the resources are available to process the subset of data, the subset of data may be processed by the vehicle at block 440.

After data has been processed and/or saved, the vehicle may determine whether additional resources have become available at block 445. The additional resources may be resources within the vehicle or may be remote resources. For example, the vehicle may arrive at a garage or other parking area where Wi-Fi is available. The vehicle may use the additional resources, e.g., Wi-Fi, to transmit the data for further processing at a remote location or, in the case where the additional resources become available on the vehicle, perform additional processing by the vehicle. The additional resources may process data that has not been processed before or in some cases further process data that has been processed previously. For example, the vehicle may determine local processor usage has dropped below a threshold for processing previously stored data. In this case, the vehicle may process the previously stored data using the additional resources. In another example, the vehicle may determine additional bandwidth is available for uploading previously stored data to a remote processing/storage device. In this case, the vehicle may use the additional resources to transmit the previously stored data for processing. If additional resources are available, additional processing may be performed at block 450.

If additional resources are not available, the resource optimization module may determine whether to purge any of the data stored in the vehicle at block 460. One or more parameters may be considered in determining whether to purge data. For example, the parameters may include: a time period for saving data, a priority of the data, and/or available storage space. The parameters may be assigned various weights in determining when to drop data from storage. If the resource optimization module determines to drop the data, the data is dropped at block 470. If the resource optimization module determines not to drop the data, the process returns to block 445.

Metadata may be added to the data at any point in the method 400. For example when data is captured at block 405 or when data is processed at blocks 420 or 440 or 450 or when it is saved at block 425 or 435.

Figure 5:
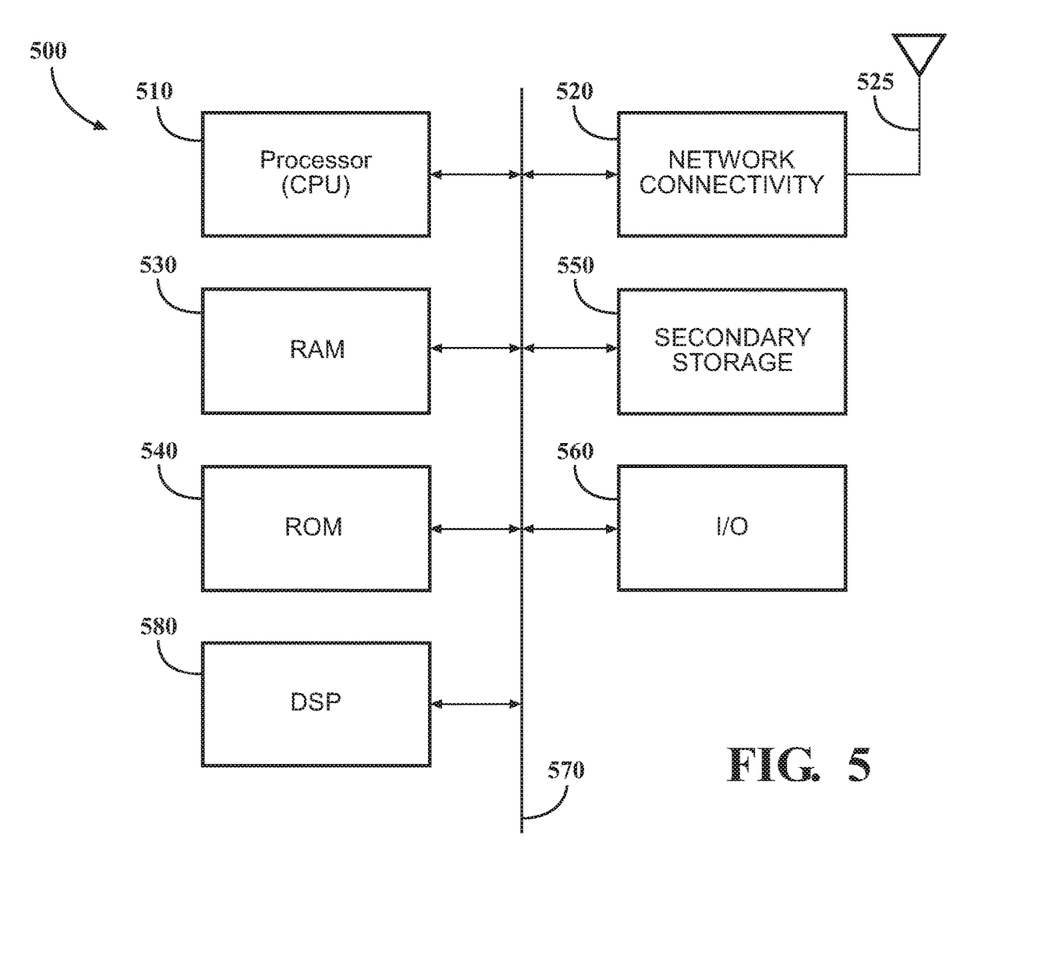
FIG. 5 is a diagram of an embodiment of a system for resource optimization in a vehicle.

FIG. 5 is a diagram of an embodiment of a system 500 that includes a processor 510 suitable for implementing one or more embodiments disclosed herein, e.g., resource optimization module 120 and/or ECU 140. The processor 510 may control the overall operation of the system.

In addition to the processor 510 (which may be referred to as a central processor unit or CPU), the system 500 might include network connectivity devices 520, random access memory (RAM) 530, read only memory (ROM) 540, secondary storage 550, and input/output (I/O) devices 560. These components might communicate with one another via a bus 570. In some cases, some of these components may not be present or may be combined in various combinations with one another or with other components not shown. These components might be located in a single physical entity or in more than one physical entity. Any actions described herein as being taken by the processor 510 might be taken by the processor 510 alone or by the processor 510 in conjunction with one or more components shown or not shown in the drawing, such as a digital signal processor (DSP) 580. Although the DSP 580 is shown as a separate component, the DSP 580 might be incorporated into the processor 510.

The processor 510 executes instructions, codes, computer programs, or scripts that it might access from the network connectivity devices 520, RAM 530, ROM 540, or secondary storage 550 (which might include various disk-based systems such as hard disk, floppy disk, or optical disk). The resource optimization module 120 may be instructions, codes, computer programs, or scripts executed by processor 510.

While only one CPU 510 is shown, multiple processors may be present. Thus, while instructions may be discussed as being executed by a processor, the instructions may be executed simultaneously, serially, or otherwise by one or multiple processors. The processor 510 may be implemented as one or more CPU chips and may be a hardware device capable of executing computer instructions.

The network connectivity devices 520 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, controller area network (CAN), domestic digital bus (D2B), and/or other well-known devices for connecting to networks. These network connectivity devices 520 may enable the processor 510 to communicate with the Internet or one or more telecommunications networks or other networks from which the processor 510 might receive information or to which the processor 510 might output information. The network connectivity devices 520 might also include one or more transceiver components 525 capable of transmitting and/or receiving data wirelessly.

The RAM 530 might be used to store volatile data and perhaps to store instructions that are executed by the processor 510. The ROM 540 is a non-volatile memory device that typically has a smaller memory capacity than the memory capacity of the secondary storage 550. ROM 540 might be used to store instructions and perhaps data that are read during execution of the instructions. Access to both RAM 530 and ROM 540 is typically faster than to secondary storage 550. The secondary storage 550 is typically comprised of one or more disk drives or tape drives and might be used for non-volatile storage of data or as an over-flow data storage device if RAM 530 is not large enough to hold all working data. Secondary storage 550 may be used to store programs that are loaded into RAM 530 when such programs are selected for execution.

The I/O devices 560 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 525 might be considered to be a component of the I/O devices 560 instead of or in addition to being a component of the network connectivity devices 520.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

It will be understood by one having ordinary skill in the art that construction of the described invention and other components is not limited to any specific material. Other exemplary embodiments of the invention disclosed herein may be formed from a wide variety of materials, unless described otherwise herein.

As used herein, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium.

What is claimed is:

1. A system for resource optimization in a vehicle, the system comprising:
    a memory;
    a processor coupled to the memory; and
    a resource optimization module including instructions that when executed by the processor cause the processor:
        monitor usage of local computing resources of the vehicle, the local computing resources comprising the processor and available bandwidth of a transmission medium;
        determine an availability of the local computing resources;
        evaluate data captured by one or more sensors of the vehicle;
        determine whether to process the data locally or remotely based, at least in part, on the availability of the local computing resources and the data captured by the one or more sensors; and
        when the data is processed locally producing first results, subsequently process the data a second time using different software to produce second results, compare the first results to the second results, and adjust a detection algorithm of the one or more sensors based on the comparison.

2. The system of claim 1, wherein the resource optimization module is further configured to determine to process the data locally based, at least in part, on the availability of the local computing resources indicating that the processor has sufficient processing power to execute a processing algorithm on the data while the vehicle is in motion.

3. The system of claim 1, wherein the processor is configured to process the data based upon the resource optimization module determining the availability of local computing resources is adequate for processing the data.

4. The system of claim 3, wherein the processor is further configured to store:
    a result comprising processed data;
    the data; and
    metadata comprising a tag indicating the data has been processed.

5. The system of claim 4, wherein the resource optimization module is further configured to:
    determine an availability of additional computing resources; and
    determine, based upon determining the availability of the additional computing resources, to remotely process one or more of: at least portion of the data and the result.

6. The system of claim 1, wherein the processor is further configured to store:
    at least a portion of the data for later processing based upon the resource optimization module determining the availability of local computing resources is not adequate for processing the data; and
    metadata comprising a first tag indicating the data has not been processed.

7. The system of claim 6, wherein the processor is further configured to:
    process a subset of the data based upon the resource optimization module determining the availability of local computing resources is adequate for processing the subset of the data; and
    write a second tag indicating the subset of the data has been processed to the metadata.

8. The system of claim 7, wherein the resource optimization module is further configured to:
    determine an availability of additional computing resources; and
    determine to process at least a portion of the data remotely based upon determining the availability of the additional computing resources.

9. The system of claim 6, wherein the resource optimization module is further configured to:
    determine an availability of additional computing resources;
    analyze the metadata associated with the data; and determine not to process at least a portion of the data remotely based upon determining a second tag in the metadata indicates the data should not be transmitted.

10. A method for resource optimization in a vehicle, the method comprising:
monitoring usage of local computing resources of the vehicle, the local computing resources comprising a processor and available bandwidth of a transmission medium;
determining an availability of the local computing resources;
evaluating data captured by one or more sensors of the vehicle;
determining whether to process the data locally or remotely based, at least in part, on the availability of the local computing resources and the data captured by the one or more sensors; and
when the data is processed locally producing first results:
subsequently processing the data a second time using different software to produce second results,
comparing the first results to the second results, and
adjusting a detection algorithm of the one or more sensors based on the comparison.

11. The method of claim 10, further comprising creating metadata describing characteristics of the data.

12. The method of claim 10, further comprising processing the data based upon determining the availability of local computing resources is adequate for processing the data.

13. The method of claim 12, further comprising storing:
a result comprising processed data;
the data; and
metadata comprising a tag indicating the data has been processed.

14. The method of claim 13, further comprising:
determining an availability of additional computing resources; and
remotely processing, based upon determining the availability of the additional computing resources, one or more of: at least portion of the data and the result.

15. The method of claim 10, further comprising:
storing at least a portion of the data for later processing based upon determining the availability of local computing resources is not adequate for processing the data; and
storing metadata comprising a first tag indicating the data has not been processed.

16. The method of claim 15, further comprising:
processing a subset of the data based upon determining the availability of local computing resources is adequate for processing the subset of the data; and
writing a second tag indicating the subset of the data has been processed to the metadata.

17. The method of claim 16, further comprising:
determining an availability of additional computing resources; and
processing at least a portion of the data remotely based upon determining the availability of the additional computing resources.

18. The method of claim 15, further comprising:
determining an availability of additional computing resources;
analyzing the metadata associated with the data; and
determining not to process at least a portion of the data remotely based upon determining a second tag in the metadata indicates the data should not be transmitted.

19. A vehicle comprising:
one or more sensors;
a memory;
a processor coupled to the memory; and
a resource optimization module including instructions that when executed by the processor cause the processor:
monitor usage of local computing resources of the vehicle, the local computing resources comprising the processor and available bandwidth of a transmission medium;
determine an availability of the local computing resources;
evaluate data captured by the one or more sensors;
determine whether to process the data locally or remotely based, at least in part, on the availability of the local computing resources and the data captured by the one or more sensors; and
when the data is processed locally producing first results:
subsequently process the data a second time using different software to produce second results,
compare the first results to the second results, and
adjust a detection algorithm of the one or more sensors based on the comparison.

20. The vehicle of claim 19, wherein the resource optimization module is further configured to:
determine an availability of additional computing resources; and
determine to process at least a portion of the data remotely based upon determining the availability of the additional computing resources.

21. The method of claim 10, further comprising determining to process the data locally when the data contains personally identifiable information.

* * * * *

UNITED STATES PATENT AND TRADEMARK OFFICE
CERTIFICATE OF CORRECTION

PATENT NO. : 10,759,444 B2
APPLICATION NO. : 15/644283
DATED : September 1, 2020
INVENTOR(S) : Nikolaos Michalakis et al.

Page 1 of 1

It is certified that error appears in the above-identified patent and that said Letters Patent is hereby corrected as shown below:

In the Claims

Column 9, Lines 62-63 should read:
that when executed by the processor cause the processor to:

Column 12, Lines 20-21 should read:
that when executed by the processor cause the processor to:

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*